(12) United States Patent
Bellanger et al.

(10) Patent No.: US 8,840,064 B2
(45) Date of Patent: Sep. 23, 2014

(54) STUB FRAME FOR A CASCADE THRUST REVERSER STRUCTURE

(75) Inventors: Alexandre Bellanger, Le Havre (FR); Laurent Dubois, Le Havre (FR); Florent Bouillon, Anglesqueville l'esneval (FR); Stephane Bardin, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 13/516,779

(22) PCT Filed: Nov. 29, 2010

(86) PCT No.: PCT/FR2010/052556
§ 371 (c)(1),
(2), (4) Date: Jun. 18, 2012

(87) PCT Pub. No.: WO2011/073549
PCT Pub. Date: Jun. 23, 2011

(65) Prior Publication Data
US 2012/0256051 A1    Oct. 11, 2012

(30) Foreign Application Priority Data
Dec. 18, 2009  (FR) ...................................... 09 06158

(51) Int. Cl.
*F02K 3/02*     (2006.01)
*F02K 1/32*     (2006.01)
*F02K 1/72*     (2006.01)

(52) U.S. Cl.
CPC ................. *F02K 1/72* (2013.01); *Y02T 50/672* (2013.01); *F05D 2300/603* (2013.01)
USPC .................... 244/110 B; 244/53 R; 60/226.2; 60/230

(58) Field of Classification Search
USPC ................... 244/53 R, 110 B; 60/226.2, 230
See application file for complete search history.

(56) References Cited

U.S. PATENT DOCUMENTS

| | | | | |
|---|---|---|---|---|
| 3,500,645 | A | * | 3/1970 | Hom ............................... 60/229 |
| 3,511,055 | A | * | 5/1970 | Timms ............................ 60/229 |
| 4,145,877 | A | * | 3/1979 | Montgomery ............... 60/226.2 |
| 4,373,328 | A | * | 2/1983 | Jones ........................... 60/226.2 |
| 4,564,160 | A | * | 1/1986 | Vermilye .................. 244/110 B |
| 4,998,409 | A | * | 3/1991 | Mutch .......................... 60/226.2 |

(Continued)

FOREIGN PATENT DOCUMENTS

| | | |
|---|---|---|
| EP | 1852595 A2 | 11/2007 |
| FR | 2907512 A1 | 4/2008 |
| FR | 2925607 A1 | 6/2009 |

OTHER PUBLICATIONS

International Search Report issued Feb. 24, 2011 by European Patent Office re: PCT/FR2010/052556; pp. 3; citing: US 2008/271432 A1, FR 2 907 512 A1, US 5,313,788 A, EP 1 852 595 A2 and 2 925 607 A1.

*Primary Examiner* — Tien Dinh
*Assistant Examiner* — Michael Wang
(74) *Attorney, Agent, or Firm* — Brinks Gilson & Lione

(57) ABSTRACT

A stub frame for a cascade vane thrust reverser structure of an aircraft nacelle is attached to one or more cascade vanes. The stub frame includes an integral primary structure with a C-shaped longitudinal section, a secondary structure acting as a cascade edge and attached to the primary structure at one end, and transverse stiffeners connecting the two ends of the primary structure.

13 Claims, 7 Drawing Sheets

(56) References Cited

U.S. PATENT DOCUMENTS

| | | | |
|---|---|---|---|
| 5,239,822 A * | 8/1993 | Buchacher | 60/226.2 |
| 5,313,788 A | 5/1994 | Wright et al. | |
| 6,557,799 B1 * | 5/2003 | Sternberger | 244/110 B |
| 8,156,711 B2 * | 4/2012 | Hethcock et al. | 52/790.1 |
| 2008/0271432 A1 | 11/2008 | Tsou et al. | |

* cited by examiner

STUB FRAME FOR A CASCADE THRUST REVERSER STRUCTURE

TECHNICAL FIELD

The present invention relates to a stub frame for a cascade thrust reverser structure for an aircraft nacelle.

The invention also relates to a cascade thrust reverser structure and a nacelle comprising such a stub frame.

BACKGROUND

An airplane is moved by several turbojet engines each housed in a nacelle also housing a set of connected actuating devices related to its operation and performing various functions when the turbojet engine is operating or stopped. These connected actuating devices in particular include a mechanical thrust reverser system.

More specifically, a nacelle generally has a tubular structure comprising an air intake upstream of the turbojet engine, a middle section intended to surround a fan of the turbojet engine, a downstream section housing the thrust reverser means and designed to surround the combustion chamber of the turbojet engine, and generally ends with a jet nozzle whereof the outlet is situated downstream of turbojet engine.

Modern nacelles are intended to house a dual flow turbojet engine capable of generating, by means of the rotating fan blades, a flow of hot air (also called primary flow) coming from the combustion chamber of the turbojet engine, and a flow of cold air (secondary flow) that circulates outside the turbojet engine through an annular channel, also called tunnel, formed between a fairing of the turbojet engine and an inner wall of the nacelle. The two flows of air are ejected outside the turbojet engine through the back of the nacelle.

The role of a thrust reverser is, during the landing of an airplane, to improve the braking capacity thereof by reorienting at least part of the thrust generated by the turbojet engine forward. In this phase, the reverser obstructs the annular channel of the cold air flow and orients that flow toward the front of the nacelle, thereby generating a counter-thrust that is added to the braking of the wheels of the airplane.

The means used to perform this reorientation of the cold air flow vary depending on the type of reverser. However, in all cases, the structure of a reverser includes movable cowls that can be moved between a deployed position on the one hand, in which they open a passage in the nacelle intended for the deflected flow, and on the other hand, a retracted position in which they close that passage. These cowls can perform a cascade function or simply activate other cascade means.

In the case of a cascade thrust reverser, also called a cascade reverser, the reorientation of the flow of air is done by cascade vanes associated with reverser flaps, the cowl serving simply to slide so as to uncover or cover the cascade vanes. The reverser flaps form blocking doors activated by the sliding of the cowling generally creating closing of the annular channel downstream of the vanes so as to optimize the reorientation of the cold air flow.

Generally, the cascade vanes 1 are attached to the case of the turbojet engine and the middle section of the nacelle using a stub frame 3 (see FIG. 1). The typical stub frames 3 comprise a multitude of parts, some of which are made from a composite material, and others of which are made from a metal material.

More specifically, a typical stub frame 3 comprises a front panel 5 intended to secure the middle section of the nacelle to a structural element 7 called "conical shell" belonging to the stub frame 3. Said structural element 7 enables fire resistance. The stub frame 3 also comprises a cascade edge element 9 ensuring the aerodynamic line. The front ring panel 5 and the structural element 7 are fastened together.

An inner ring 11 makes it possible to fasten one end of the structural element 7 and one end of the cascade edge element 9. Said inner ring 11 also makes it possible to fasten the stub frame 3 to the case of the turbojet engine by means of an attached piece 15. An outer ring 17 makes it possible to fasten the structural element 7, the cascade vane 1, and the cascade edge element 9.

The stub frame 3 also comprises stiffeners (not shown).

Generally, the stiffeners, the inner ring 11, and the outer ring 17 are made from a metal material.

The stub frame 5, the structural element 7, and the cascade edge element 9 are made from a composite material.

The number of parts necessary to form a stub frame as well as the use of different types of materials make the manufacture and installation of said stub frame complex.

There is therefore a need to provide a stub frame for a nacelle that makes it possible to reduce the mass, production costs, and head losses.

BRIEF SUMMARY

One aim of the present invention is therefore to provide a stub frame for a cascade vane thrust reverser structure, that is simple to make and has a lower mass.

To that end, according to a first aspect, the invention relates to a stub frame for a cascade vane thrust reverser structure of an aircraft nacelle, said stub frame being intended to be attached to one or more cascade vanes and including:

an integral primary structure with a substantially C-shaped longitudinal section, a secondary structure acting as a cascade edge and attached to said primary structure at one end, and transverse stiffeners connecting the two ends of the primary structure.

The stub frame according to the invention thus has a reduced number of parts relative to the prior art. Furthermore, the decrease in the number of parts makes it possible to reduce the mass, production cost, and head losses, and to integrate all of the functions of a stub frame.

The stub frame according to the invention is therefore easier to manufacture and install than the stub frames of the prior art.

According to other features of the invention, the stub frame of the invention comprises one or more of the following optional features, considered alone or according to all possible combinations:

the primary structure, the secondary structure, and the stiffeners are made from a composite material;

the composite material is chosen from amongst materials with a base of carbon fibers, glass fibers, aramid fibers, or a mixture of those materials with an epoxy resin or bis-maleimide (BMI);

the primary structure and the secondary structure are made in a single piece;

the primary structure comprises a protuberance having a substantially flat surface configured to come into contact with a substantially flat end of the cascade vane;

the protuberance is made in a single piece with the primary structure;

an additional element is attached on the primary structure and configured to allow the stub frame to be fastened with at least one cascade vane, said additional element comprising openings in which protuberances belonging to the primary structure can be inserted;

the transverse stiffeners and the primary structure form a space comprising a compact material making it possible to facilitate the assembly of the stiffeners and the primary structure while forming a bearing;

the transverse stiffeners are monolithic and are substantially in the shape of an I, T, or a reversed L;

the free end of the secondary structure is configured to receive a turbojet engine case directly, which makes it possible to do away with an intermediate part making it possible to connect a turbojet engine case to the stub frame according to the invention.

According to another aspect, the invention relates to a cascade vane thrust reverser structure for an aircraft nacelle, said structure including at least one cascade vane and at least one stub frame according to the invention, the frame(s) being intended to be connected to one or more cascade vanes.

Preferably, the cascade vane(s) comprise an end intended to be fastened with a stub frame, said end having a bent shape configured to come into contact on the primary structure of the stub frame so as to allow fastening through the surfaces in contact.

According to still another aspect, the invention relates to a nacelle comprising a thrust reverser structure according to the invention.

BRIEF DESCRIPTION OF THE DRAWINGS

The invention will be better understood upon reading the following non-limiting description, done in reference to the appended figures.

DETAILED DESCRIPTION

A nacelle is intended to make up a tubular housing for a dual flow turbojet engine with a high bypass ratio and is used to channel the flows of air it generates through the blades of the fan, i.e. a hot air flow passing through a combustion chamber of the turbojet engine, and a cold air flow circulating outside the turbojet engine.

Figure 1:
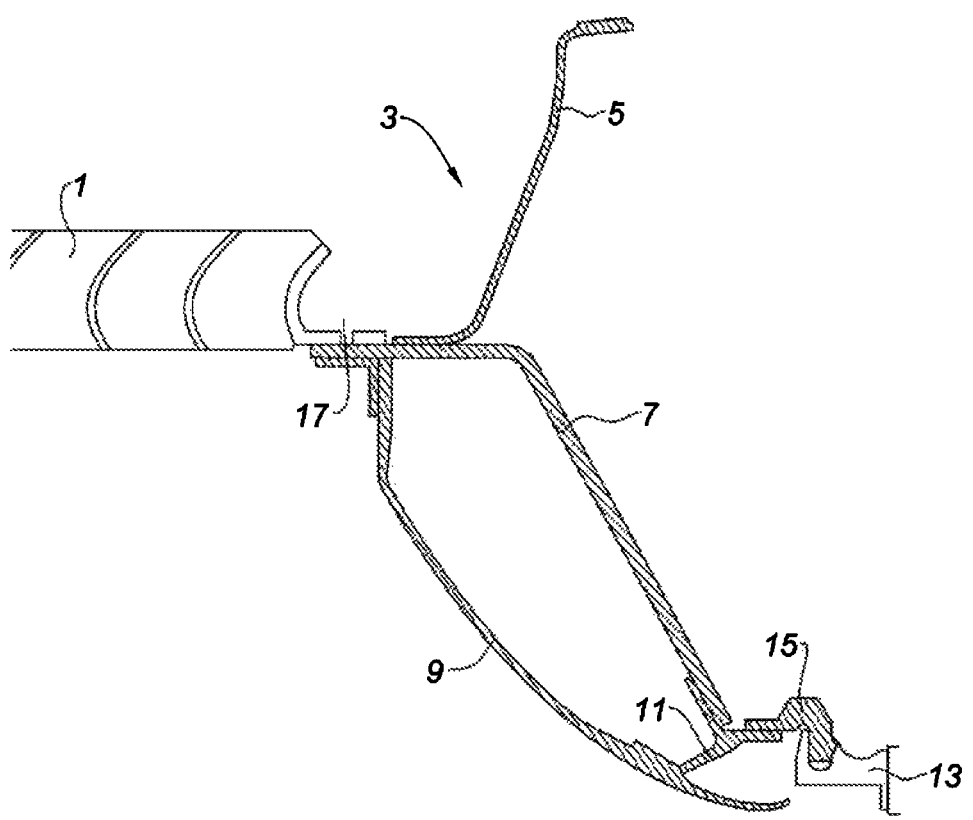
FIG. 1 is a longitudinal cross-section of a stub frame of the prior art connected to a cascade vane.
Figure 2:
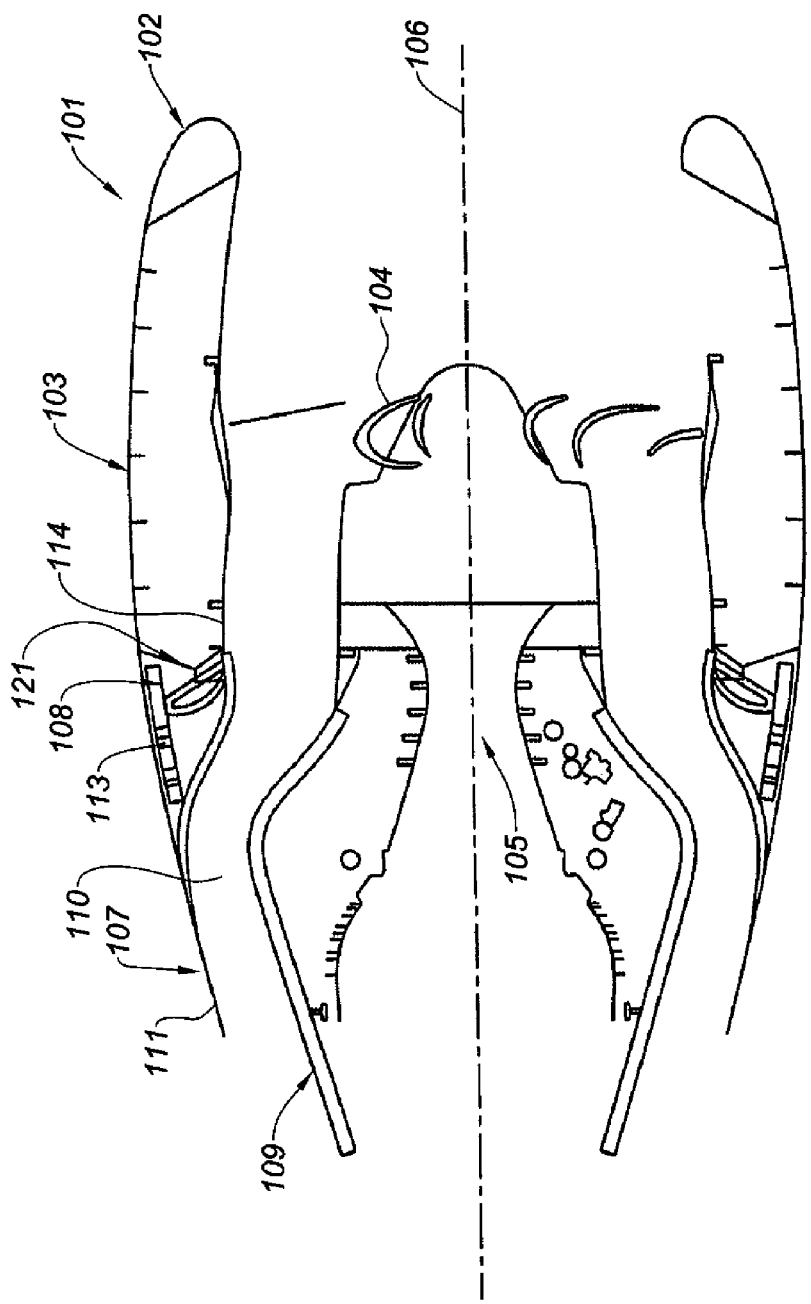
FIG. 2 is a diagrammatic longitudinal cross-sectional illustration of a first embodiment of a nacelle according to the invention.

More specifically, according to the embodiment shown in FIG. 2, a nacelle 101 comprises an upstream air intake structure 102, a middle structure 103 surrounding a fan 104 of a turbojet engine 105, and a downstream section.

The nacelle 1 has a tubular shape with longitudinal axis 106. "Longitudinal" here refers to a direction substantially collinear to the longitudinal axis of the nacelle. "Transverse" refers to a direction substantially perpendicular to the longitudinal axis of the nacelle.

The downstream structure comprises, in a known manner, an outer structure 107, called OFS, housing thrust reverser means 108, and an inner structure 109, called IFS. The nacelle 101 is fastened downstream using any suitable means, in particular connecting rods, to a suspension mast, not shown, intended to attach the nacelle 101 under an aircraft wing.

The inner structure 109 is intended to cover a downstream portion of the turbojet engine 105 extending downstream of the fan so as to delimit an annular channel for the passage of the hot air flow.

The outer structure 106 and the inner structure 109 also define another annular flow channel 110 for the cold air flow.

More specifically, the thrust reverser means 108 of the downstream section comprise at least one movable cowl 111 covering cascade vane 113. The cascade vanes 113 are connected to the middle section 3 and the case 114 of the turbojet engine by means of the stub frame 121 according to the invention.

Figure 3:
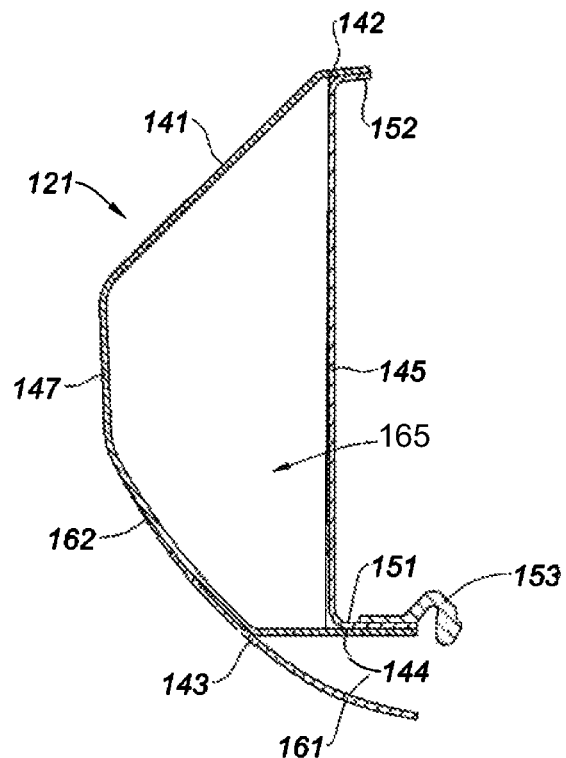
FIG. 3 is a diagrammatic longitudinal cross-section of a stub frame according to the invention.

In particular, as illustrated in FIG. 3, the stub frame 121 of the invention includes:

an integral primary structure 141 with a substantially C-shaped longitudinal section, a secondary structure 143 acting as a cascade edge and attached to said primary structure 141 at one end so as to define an inner space, and transverse stiffeners 145 connecting the two ends 142 and 144 of the primary structure.

The stub frame 121 according to the invention thus has a reduced number of elements relative to the prior art. The reduction of the number of elements making up the stub frame according to the invention 121 makes it possible to reduce the mass, the production cost by at least 30%, and head losses, and also to integrate the functions present in a stub frame.

In particular, the cost of assembling the different elements making up the stub frame of the invention 121 is decreased.

The stub frame of the invention 121 is therefore at least 15% to 30% easier to manufacture than the stub frames of the prior art.

Furthermore, the mechanical strength of the stub frame according to the invention 121 is increased in the face of fatigue stresses.

Furthermore, it is no longer necessary to have fasteners at the cascade edge of the stub frame of the invention, with the result that head losses are decreased.

The primary structure 141, the secondary structure 143, and the stiffeners 145 are preferably made from a composite material, which makes it possible to still further widen the mass of the stub frame 121 of the invention. Using a composite material makes it possible to consider integrating certain functions, such as cylinder yokes.

According to another alternative, the primary structure 141, the secondary structure 143, and the stiffeners 145 can be made from a metal material.

The composite material is typically chosen from among materials with a base of carbon fibers, glass fibers, aramid fibers, or a mixture of those materials with an epoxy resin or bis-maleimide (BMI), which makes it possible to ensure both lightening of the mass of the stub frame according to the invention 121 and to guarantee sufficient mechanical strength.

The composite material can be obtained by draping pre-impregnated fabrics or using a so-called LCM (Liquid Composite Molding) method in which the epoxy resin is mixed with dry carbon fabrics or a woven or braided preform, if applicable.

"Substantially C-shaped longitudinal section" here refers to a shape that may fit into an arc of circle. In this way, the primary structure 141 can have a rounded longitudinal section, or on the contrary, an angular longitudinal section.

The bottom 147 of the primary structure, in other words the bottom 147 of the C, is substantially flat so as to facilitate fastening of the primary structure 141 and the cascade vane 113.

The ends 142 and 144 of the primary structure are configured to come into contact with the stiffeners 145 before being fastened together. To that end, the stiffeners 145 can include ends 151 and 152 having an orientation different from that of the body of each stiffener 145, in particular perpendicular to said body.

The end 142 can be substantially conical and the end 144 can be substantially cylindrical.

An intermediate piece 153 can be mounted on one end 151 of the stiffener 145 and one end 144 of the primary structure so as to allow fastening with the case 114 of the turbojet engine.

The piece 153 can be annular or semi-annular.

The piece 153 can have a substantially J-shaped longitudinal section.

The secondary structure 143 is typically substantially in the shape of an arc of circle so as to have an inner space 161 with the primary structure 141.

The free end of the secondary structure 143 and the end 144 engaged with the intermediate piece 153 of the primary structure form the inner space 161.

To that end, said secondary structure 143 can have a portion 162 in contact with a portion of the primary structure 141 at the end of the secondary structure 143 engaged in the fastening with the primary structure 141.

According to one alternative not shown, the free end of the secondary structure 143 can be configured to receive the case 114 directly. To that end, said free end can have a shape substantially complementary to the shape of the end of the case 114 fastened on the secondary structure 143.

In this way, advantageously, any attached additional parts, such as the piece 153 described above, are eliminated.

As illustrated in FIG. 3, the primary structure 141 and the secondary structure 143 can be associated during the formation of said structures 141 and 143, in particular when the latter are made from a composite material. In this way, the junction between the primary structure 141 and the secondary structure 143 can be made by adhesion with resin during the injection of the resin in the case of an RTM (Resin Transfer Molding) production method. It is also possible to reinforce the junction of the two primary 141 and secondary 143 structures by inserting carbon wires into the thickness of the preform.

Figure 4:
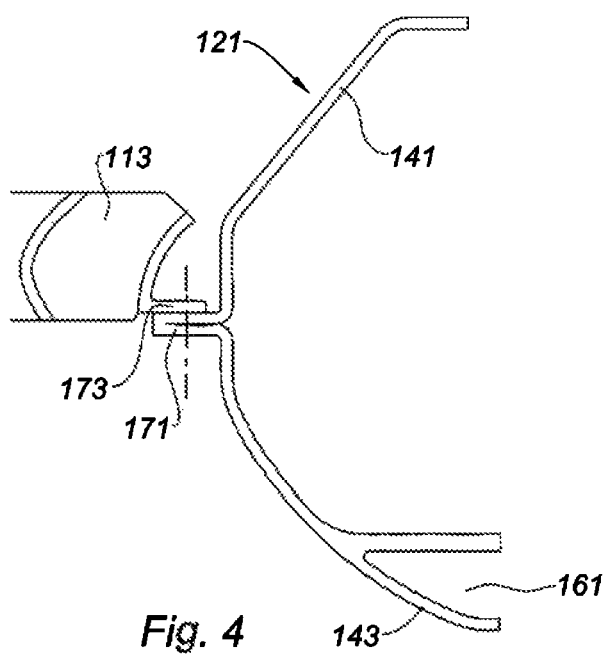
FIG. 4 is a diagrammatic longitudinal cross-section of a stub frame of the invention connected to a cascade vane.
Figure 5:
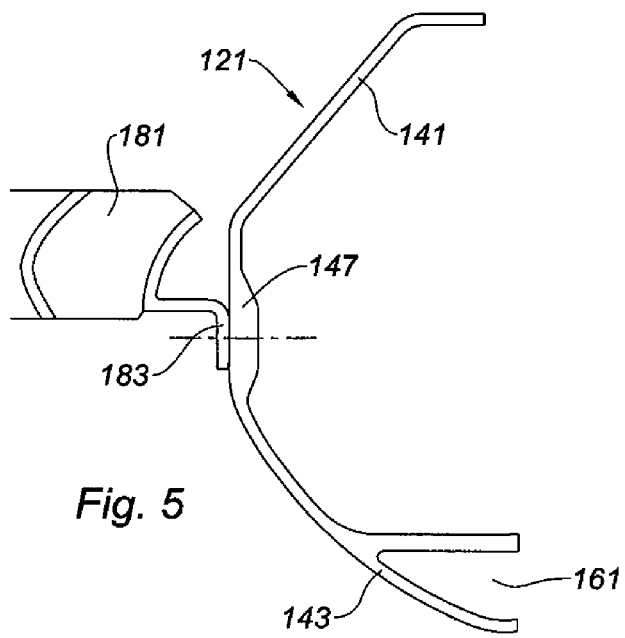
FIGS. 5 to 7 are diagrammatic longitudinal cross-sections of alternatives of the embodiment of FIG. 4.
Figure 6:
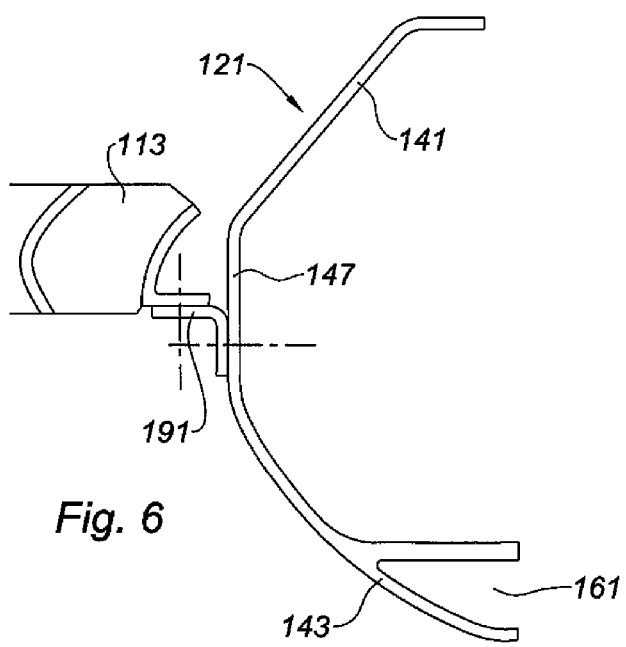

According to one alternative illustrated in FIGS. 4 to 6, the primary structure 141 and the secondary structure 143 can be made in a single piece, which still further simplifies the production of the stub frame according to the invention 121.

As illustrated in FIG. 3, the transverse stiffeners 145 and the primary structure 141 are arranged so as to form a space 165. Said space 165 may comprise a compact and light material, which may or may not have a structural role, but making it possible to facilitate the assembly of the stiffeners 145 and the primary structure 141 while forming a bearing. Thus, possible porous materials include a foam such as the Rohacell 10WF® foam, or a honeycomb-type structure.

In order to form the space 165, the transverse stiffeners 145 can be substantially vertical relative to the stub frame 121 according to the invention or, on the contrary, inclined. The transverse stiffeners 145 can be monolithic and substantially in the shape of an I, T, or reversed L.

As illustrated in FIG. 4, the stub frame 121 according to the invention comprises a protuberance 171 having a substantially conical surface configured to come into contact with a substantially flat end 173 of a cascade vane 11. In other words, the protuberance 171 can be made in a single piece with the primary structure 141. To that end, the protuberance 171 can be in the form of a ply of the wall forming the stub frame 121, or can assume the form of a bead clamping a compact core structure such as a cellular or porous core. The protuberance 171 can be made from a monolithic composite material. Thus, advantageously, it is not necessary to modify the cascade vanes typically used.

According to one alternative illustrated in FIG. 5, the cascade vane 181 comprises an end 183 intended to be fastened with the stub frame 121 according to the invention, said end 183 forming a bend configured to come into contact on the primary structure 141 so as to allow fastening through the surfaces in contact. The fastening can then be done by one or more rivets, for example.

Figure 7:
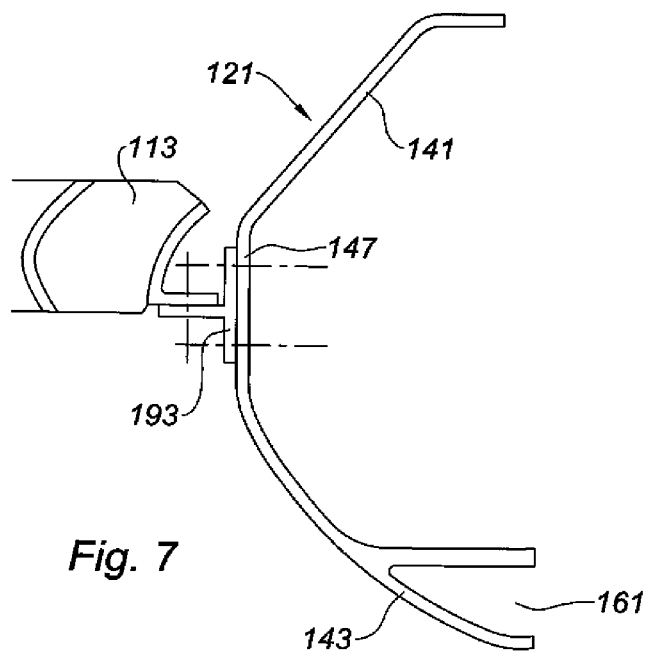

According to still another alternative, it is possible to use a typical cascade vane 113 and the stub frame according to the invention 121 in which an attached element, in particular in a substantially bent 191 or T 193 shape (see FIG. 6 and FIG. 7, respectively), ensures fastening between the primary structure 141 and said cascade vane 113.

Figure 8:
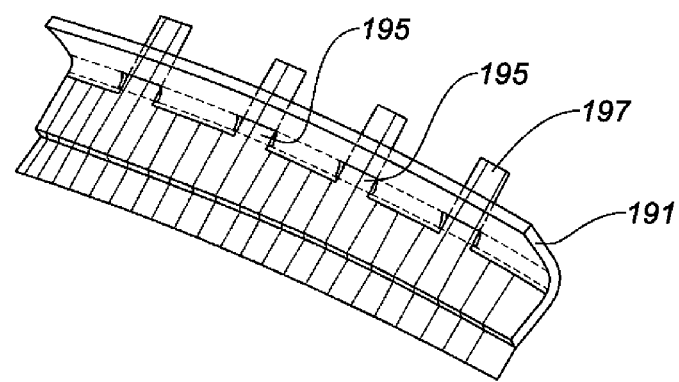
FIGS. 8 and 9 are perspective views of one embodiment of a stub frame according to the invention.
Figure 9:
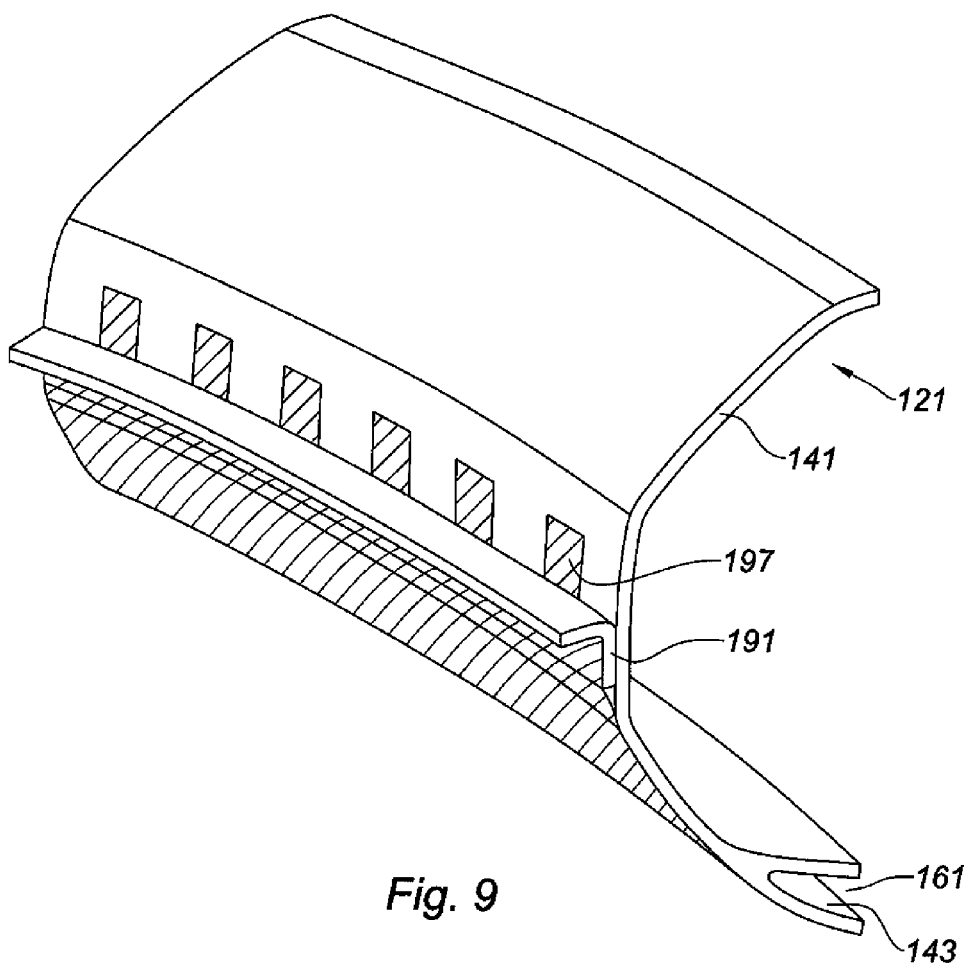

According to the embodiment illustrated in FIGS. 8 and 9, the attached element 191 and 193 can have openings 195 through which protuberances belonging to the cascade vane 113 and/or protuberances 197 belonging to the primary structure 141 are inserted so as to guarantee fastening and maintenance of the cascade vane 113 and the stub frame of the invention 121. As a result, the fastening and maintenance of the cascade vane 113 and the stub frame of the invention 121 are no longer ensured by attached outer elements, such as rivets, or by a glue to be applied. The assembly time is therefore reduced.

Figure 10:
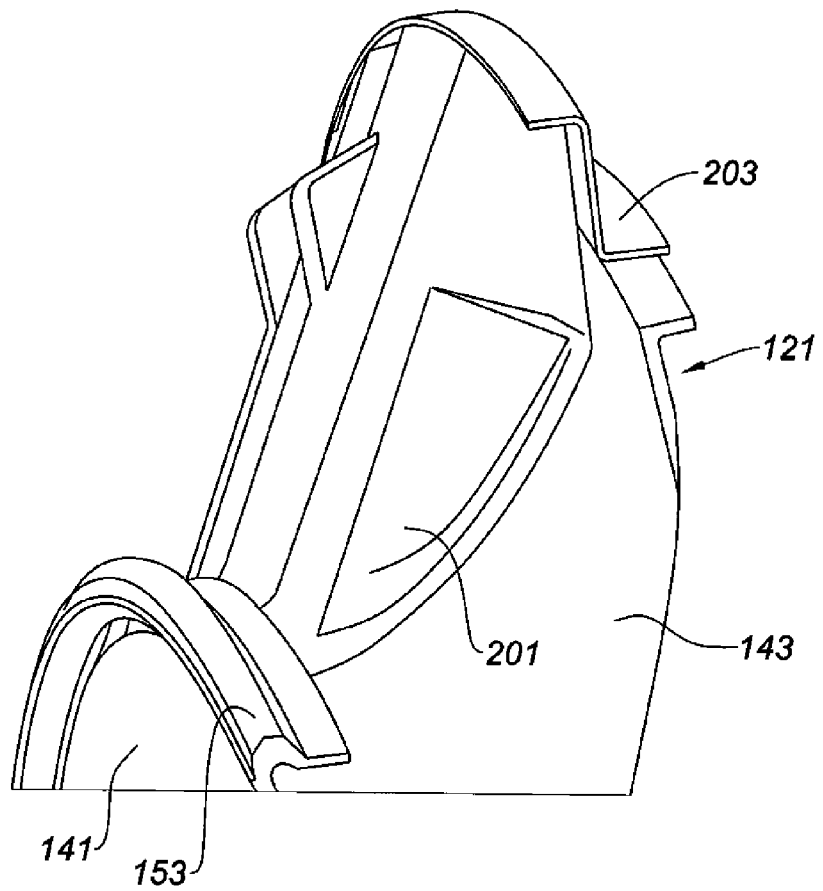
FIG. 10 is a perspective view of one embodiment of the stub frame of the invention associated with a rib and cylinder support assembly.

As illustrated in FIG. 10, the space formed 161 between the free end of the secondary structure 143 and the end 144 of the primary structure engaged with the intermediate piece 153 can comprise a rib and cylinder support assembly 201. Said assembly can be attached on the free end of the secondary structure 143 by an element 203.

When the stub frame according to the invention 121 is made from a composite material, said material can for example be obtained using a "Resin Transfer Molding" (RTM) method using a bladder or a rigid oddside mold.

According to another alternative, the elements making up the stub frame 121 can be obtained by infusing resin into the thickness and not in the direction of the fibers, as is the case in the RTM method.

It is also possible to use a draping method comprising draping plies preimpregnated with resin on a mold and curing at a temperature above 100° C.

The invention claimed is:

1. A stub frame for a cascade vane thrust reverser structure of an aircraft nacelle, said stub frame being attached to one or more cascade vanes, comprising:
   an integral primary structure with a substantially C-shaped longitudinal section and defining a bottom of the C-shaped longitudinal section at its center;
   a secondary structure acting as a cascade edge, the secondary structure having a shape of an arc and overlapping in contact with an external portion of the integral primary structure; and
   transverse stiffeners directly connected to two ends of the integral primary structure, the transverse stiffeners being connected through ends defining a perpendicular orientation relative to the bodies of the transverse stiffeners, wherein the cascade vane is attached to the primary structure at the bottom of the C-shaped longitudinal section.

2. The frame according to claim 1, wherein the primary structure, the secondary structure, and the stiffeners are made from a composite material.

3. The frame according to claim 2, wherein the composite material comprises a material with a base of carbon fibers, glass fibers, aramid fibers, or a mixture of those materials with an epoxy resin or bis-maleimide.

4. The frame according to claim 1, wherein the primary structure and the secondary structure are made in a single piece.

5. The frame according to claim 1, wherein the primary structure comprises a protuberance having a substantially flat surface configured to come into contact with a substantially flat end of the cascade vane.

6. The frame according to claim 5, wherein the protuberance is made in a single piece with the primary structure.

7. The frame according to claim 1, wherein an additional element is attached on the primary structure and configured to allow the stub frame to be fastened with at least one cascade vane, said additional element comprising openings in which protuberances belonging to the primary structure can be inserted.

8. The frame according to claim 1, wherein the transverse stiffeners and the primary structure form a space comprising a compact material.

9. The frame according to claim 1, wherein the transverse stiffeners are monolithic and are substantially in the shape of an I, T, or a reversed L.

10. The frame according to claim 1, wherein a free end of the secondary structure is configured to receive a turbojet engine case directly.

11. A cascade vane thrust reverser structure for an aircraft nacelle, said structure including at least one cascade vane and at least one stub frame according to claim 1, the stub frame(s) being intended to be connected to one or more cascade vanes.

12. The structure according to claim 11, wherein the cascade vane(s) comprise an end intended to be fastened with the stub frame, said end having a bent shape configured to come into contact on the primary structure of the stub frame so as to allow fastening through the surfaces in contact.

13. A nacelle comprising a thrust reverser structure according to claim 11.

* * * * *